United States Patent
Sono

(10) Patent No.: US 9,307,106 B1
(45) Date of Patent: Apr. 5, 2016

(54) IMAGE FORMING APPARATUS

(71) Applicant: FUJI XEROX CO., LTD., Tokyo (JP)

(72) Inventor: Yuichi Sono, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/708,683

(22) Filed: May 11, 2015

(30) Foreign Application Priority Data

Oct. 22, 2014 (JP) .................................. 2014-215443

(51) Int. Cl.
*G03G 15/00* (2006.01)
*H04N 1/00* (2006.01)
*G03G 21/16* (2006.01)

(52) U.S. Cl.
CPC ....... *H04N 1/00559* (2013.01); *G03G 21/1661* (2013.01)

(58) Field of Classification Search
USPC .......................... 399/107, 110, 111–114, 118
See application file for complete search history.

(56) References Cited

U.S. PATENT DOCUMENTS

| 5,978,626 | A | * | 11/1999 | Nagamine | .......... | G03G 21/1628 |
| | | | | | | 399/110 |
| 7,991,325 | B2 | | 8/2011 | Yamaguchi | | |
| 8,867,956 | B2 | | 10/2014 | Sato | | |
| 2007/0110475 | A1 | * | 5/2007 | Idehara | .............. | G03G 21/1666 |
| | | | | | | 399/118 |
| 2014/0064781 | A1 | * | 3/2014 | Hashimoto | ........ | G03G 21/1666 |
| | | | | | | 399/110 |
| 2014/0210929 | A1 | | 7/2014 | Suzuki | | |

FOREIGN PATENT DOCUMENTS

| JP | 2009080394 A | 4/2009 |
| JP | 4678889 B2 | 4/2011 |
| JP | 2012168273 A | 9/2012 |

* cited by examiner

*Primary Examiner* — Hoan Tran
(74) *Attorney, Agent, or Firm* — Oliff PLC

(57) ABSTRACT

An image forming apparatus includes plural image holding bodies, plural image writing devices, a movement member, and a retractor. The image holding bodies are arranged in a predetermined direction. The image writing devices face and write images onto the respective image holding bodies. The movement member holds the image holding bodies, is able to be drawn through an opening in a cover of a housing of the image forming apparatus, and is moved in an image holding body arrangement direction. The retractor retracts the image writing devices when the movement member is drawn through the opening. The retractor includes first and second retracting mechanisms. The first retracting mechanism retracts the image writing devices to respective first retracted positions. The second retracting mechanism retracts the image writing devices to respective second retracted positions after the first retracting mechanism has retracted the image writing devices.

8 Claims, 17 Drawing Sheets

IMAGE FORMING APPARATUS

CROSS-REFERENCE TO RELATED APPLICATIONS

This application is based on and claims priority under 35 USC 119 from Japanese Patent Application No. 2014-215443 filed Oct. 22, 2014.

BACKGROUND

Technical Field

The present invention relates to an image forming apparatus.

SUMMARY

According to an aspect of the present invention, an image forming apparatus includes plural image holding bodies, plural image writing devices, a movement member, and a retractor. The plural image holding bodies are arranged in a predetermined direction. The plural image writing devices face the respective image holding bodies and write images onto the respective image holding bodies. The movement member holds the plural image holding bodies, is able to be drawn through an opening in a cover of a housing of the image forming apparatus, and is moved in a direction in which the image holding bodies are arranged. The retractor retracts the image writing devices from a movement region of the movement member when the movement member is drawn through the opening in the cover. The retractor includes a first retracting mechanism and a second retracting mechanism. The first retracting mechanism retracts the image writing devices away from the respective image holding bodies to respective first retracted positions along respective straight loci. The second retracting mechanism retracts the image writing devices to respective second retracted positions along respective curved loci after the first retracting mechanism has retracted the image writing devices.

BRIEF DESCRIPTION OF THE DRAWINGS

Exemplary embodiments of the present invention will be described in detail based on the following figures, wherein.

DETAILED DESCRIPTION

An Outline of Exemplary Embodiments

Figure 1:
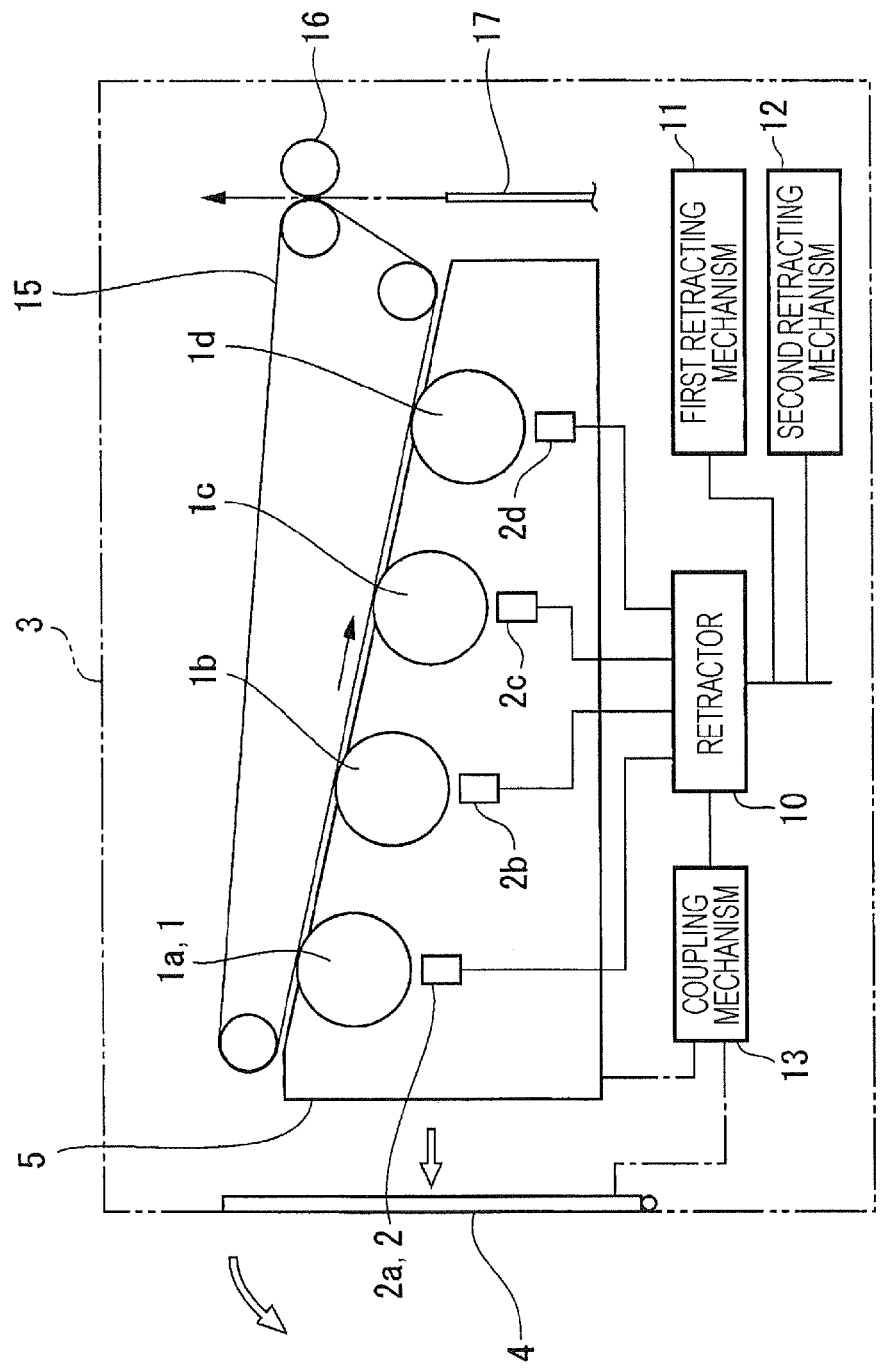
FIG. 1 is an explanatory view illustrating an outline of an exemplary embodiment of an image forming apparatus to which the present invention is applied.

FIG. 1 illustrates an outline of an exemplary embodiment of an image forming apparatus to which the present invention is applied.

Figure 2A:
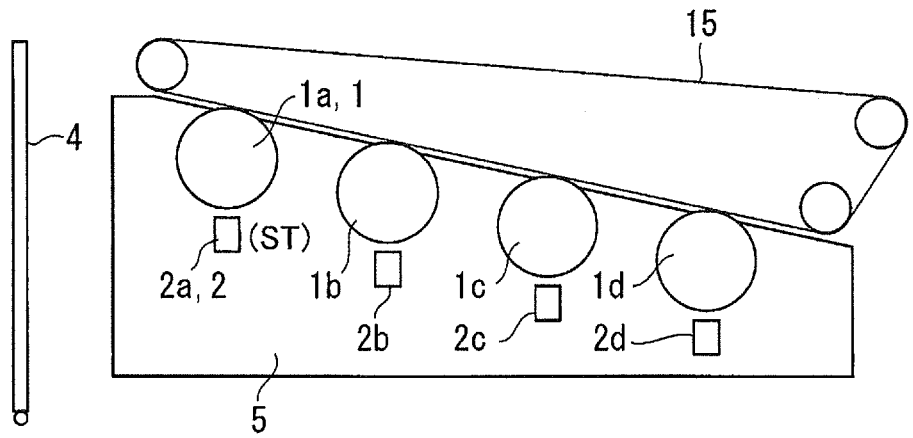
FIG. 2A is a schematic view illustrating a state in which image writing devices are positioned at respective write positions.
Figure 2B:
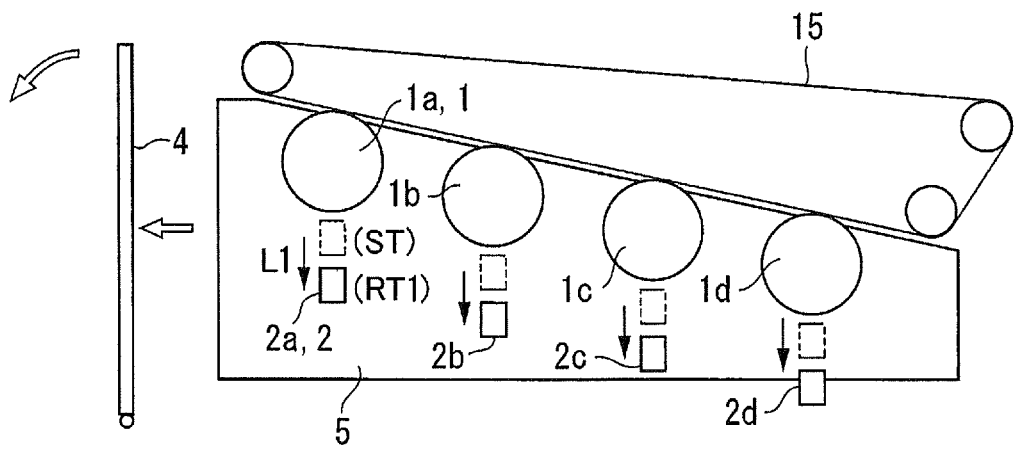
FIG. 2B is a schematic view illustrating a retracting operation of the image writing devices performed by a first retracting mechanism.
Figure 2C:
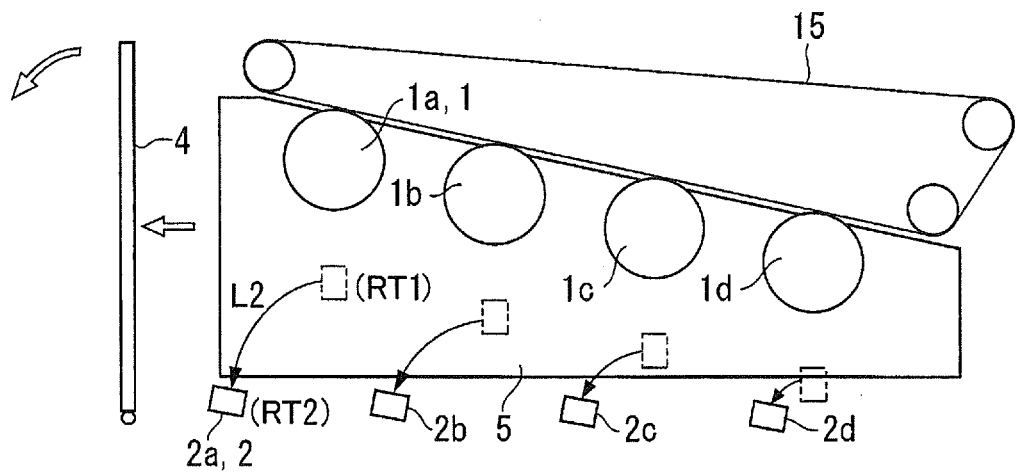
FIG. 2C is a schematic view illustrating a retracting operation of the image writing devices performed by a second retracting mechanism.

Referring to FIG. 1, the image forming apparatus includes plural (four in the present example) image holding bodies 1 (1a to 1d in the present example), plural (four in the present example) image writing devices 2 (2a to 2d in the present example), a movement member 5, and a retractor 10. The plural image holding bodies 1 are arranged in a predetermined direction. The image writing devices 2 face and write an image onto the respective image holding bodies 1. The movement member 5 holds the plural image holding bodies 1, is able to be drawn through an opening in a cover 4 of an apparatus housing 3, and is moved relative to an arrangement direction of the image holding bodies 1. The retractor 10 retracts the image writing devices 2 from a movement region of the movement member 5 when the movement member 5 is drawn through the opening in the cover 4. The retractor 10 includes a first retracting mechanism 11 (see FIGS. 2A and 2B) and a second retracting mechanism 12 (see FIG. 2C). The first retracting mechanism 11 retracts the image writing devices 2 away from the respective image holding bodies 1 to respective first retracted positions RT1 along respective straight loci L1. The second retracting mechanism 12 retracts the image writing devices 2 having been retracted by the first retracting mechanism 11 to respective second retracted position RT2 along respective curved loci L2.

Although an image forming method may be appropriately selected for the image forming apparatus illustrated in FIG. 1, the following method is adopted for this image forming apparatus: images are written onto the image holding bodies 1 by, for example, an electrophotographic system; these written images are visualized by developer such as toner; the visualized images on the image holding bodies 1 are transferred onto an intermediate transfer body 15 and then collectively transferred onto a recording medium 17 by using a transfer device 16.

In such a technical structure, the image forming apparatus of the present example is typically applicable to a form in which the plural image holding bodies 1 are arranged in a predetermined direction. With this form, the movement member 5 that holds the plural image holding bodies 1 may be drawn through the opening in the cover 4 of the apparatus housing 3.

A representative form of the present example is as follows: the image holding bodies 1 are integrated with other devices (such as chargers, developing devices, and cleaners) to form respective process cartridges, which are disposed in the movement member 5.

The image writing devices 2 may be appropriately selected as long as the image writing devices 2 are provided corresponding to the respective image holding bodies 1 and write images onto the respective image holding bodies 1. Examples of each of the image writing devices 2 include a print head using LEDs as light sources (abbreviated to LPH) and an ion-current writing head.

Furthermore, the movement member 5 is moved relative to the arrangement direction of the image holding bodies 1, and the image writing devices 2 are disposed near the respective image holding bodies 1. Thus, in order to, for example, replace any one of the image holding bodies 1, it may be required that interference of the image writing devices 2 with the image holding bodies 1 be avoided when the image holding bodies 1 are drawn by using the movement member 5.

In the present example, when the movement member 5 is drawn, the retractor 10 retracts the image writing devices 2 to respective positions set in a region outside the movement region of the movement member 5.

In this case, the retractor 10 includes two systems having different retracting loci. As a form of the first retracting mechanism 11, it is sufficient that the first retracting mechanism 11 advance and retract the image writing devices 2 along the respective straight loci L1 between respective write positions ST and the respective first retracted positions RT1. As a form of the second retracting mechanism 12, it is sufficient that the second retracting mechanism 12 move the image writing devices 2 along the respective curved loci L2 between the respective first retracted positions RT1 and the respective second retracted positions RT2.

With this form, the retractor 10 retracts the image writing devices 2 along the retracting loci of the two systems. Thus, unlike a form in which the image writing devices 2 are retracted along retracting loci of a single system (straight loci or curved loci), it is not necessarily required to unnecessarily allocate retracting spaces in a direction away from the image holding bodies 1 or arrangement spaces between the image holding bodies 1.

Furthermore, the first retracting mechanism 11 advances and retracts the image writing devices 2 along the respective straight loci L1. This may facilitate setting of the write positions ST with respect to the respective image holding bodies 1 at predetermined positions. Furthermore, the image writing devices 2 are moved along the respective curved loci L2 by the second retracting mechanism 12 after the image writing devices 2 have been retracted to the respective first retracted positions RT1. Thus, the retracting spaces for the image writing devices 2 may be easily set compared to the case where the retracting spaces are set near the image holding bodies 1.

Next, representative and other forms of the image forming apparatus according to the present exemplary embodiment will be described.

Initially, an example of arrangement of the plural image holding bodies 1 is a form of inclined arrangement in which the image holding bodies 1 are arranged in a direction downwardly inclined from the cover 4 side of the apparatus housing 3.

Since the present example is the form of the inclined arrangement in which the plural image holding bodies 1 are arranged in the downwardly inclined direction from the cover 4 side, a space behind the cover 4 may be reduced compared to a horizontal arrangement method. When using the method in which each of the image writing devices 2 is retracted along the retracting locus of the single retracting system, this inclined arrangement may increase the retracting spaces compared to a horizontal arrangement method. However, when using a two-step method of the present example, the image writing devices 2 may be retracted without unnecessarily increasing the volume of the retracting spaces.

Furthermore, a form of the retractor 10 includes a coupling mechanism 13, an operation of which is coupled with an opening operation of the cover 4 or a drawing operation of the movement member 5. As a technique of operating the retractor 10, the retractor 10 may be operated by operating an operating member (not illustrated). However, from the viewpoint of easily performing a drawing operation of the plural image holding bodies 1, the following method of coupling (coupling method) may be used: an operation of the retractor 10 is coupled with the opening operation of the cover 4 or the drawing operation of the movement member 5 by using the coupling mechanism 13.

Furthermore, as a supplement to the description of the setting of the first retracted positions RT1, it is sufficient that the first retracted positions RT1 of the image writing devices 2 retracted by the first retracting mechanism 11 be set within the movement region of the movement member 5. Despite the existence of the first retracted positions RT1 within the movement region of the movement member 5 as described above, the image writing devices 2 may be moved to the outside of the movement region of the movement member 5 by a retracting operation performed by the second retracting mechanism 12.

In a representative form of the retractor 10, for which the coupling method is adopted, the first retracting mechanism 11 and the second retracting mechanism 12 respectively include a coupling sub-mechanism 13-1 and a coupling sub-mechanism 13-2, operations of which are coupled with the drawing operation of the movement member 5. The operations of the coupling sub-mechanisms 13-1 and 13-2 of the present example are coupled with the drawing operation of the movement member 5, and the coupling sub-mechanisms 13-1 and 13-2 sequentially cause the first retracting mechanism 11 and the second retracting mechanism 12 to operate.

Furthermore, as another representative form of the retractor 10 for which the coupling method is adopted includes the first retracting mechanism 11 including the coupling sub-mechanism 13-1, the operation of which is coupled with the opening operation of the cover 4, and the second retracting mechanism 12 including a coupling sub-mechanism 13-2, an operation of which is coupled with the drawing operation of the movement member 5. The coupling sub-mechanisms 13-1 and 13-2 of the present example cause the first retracting mechanism 11 and the second retracting mechanism 12 to sequentially operate when the opening operation of the cover 4 and the drawing operation of the movement member 5 are performed.

Furthermore, a representative form of the first retracting mechanism 11 includes plural advancing and retracting members (not illustrated) that support the image writing devices 2 such that the image writing devices 2 may be advanced and retracted along the respective straight loci L1 and a connecting member (not illustrated) that connects the plural advancing and retracting members to one another. In the present example, it is sufficient that the coupling mechanism 13 include a function member (not illustrated), an operation of which is coupled with the opening operation of the cover 4 or the drawing operation of the movement member 5 and which is engaged with the connecting member so as to retract each of the advancing and retracting members in a direction away from the image holding bodies 1.

Furthermore, a representative form of the second retracting mechanism 12 includes plural swing members (not illustrated) that support the image writing devices 2 such that the image writing devices 2 may swing along the respective curved loci L2 and a connecting member (not illustrated) by which the plural swing members are swingably connected to one another. It is sufficient that the coupling mechanism 13 include a function member (not illustrated), an operation of which is coupled with the opening operation of the cover 4 or the drawing operation of the movement member 5 and which is engaged with the connecting member so as to swing the swing members so that the image writing devices 2 are retracted to positions outside the movement region of the movement member 5.

The exemplary embodiments according to the present invention illustrated in the accompanying drawings will be described in detail below.

First Exemplary Embodiment

An Overall Structure of an Image Forming Apparatus

Figure 3:
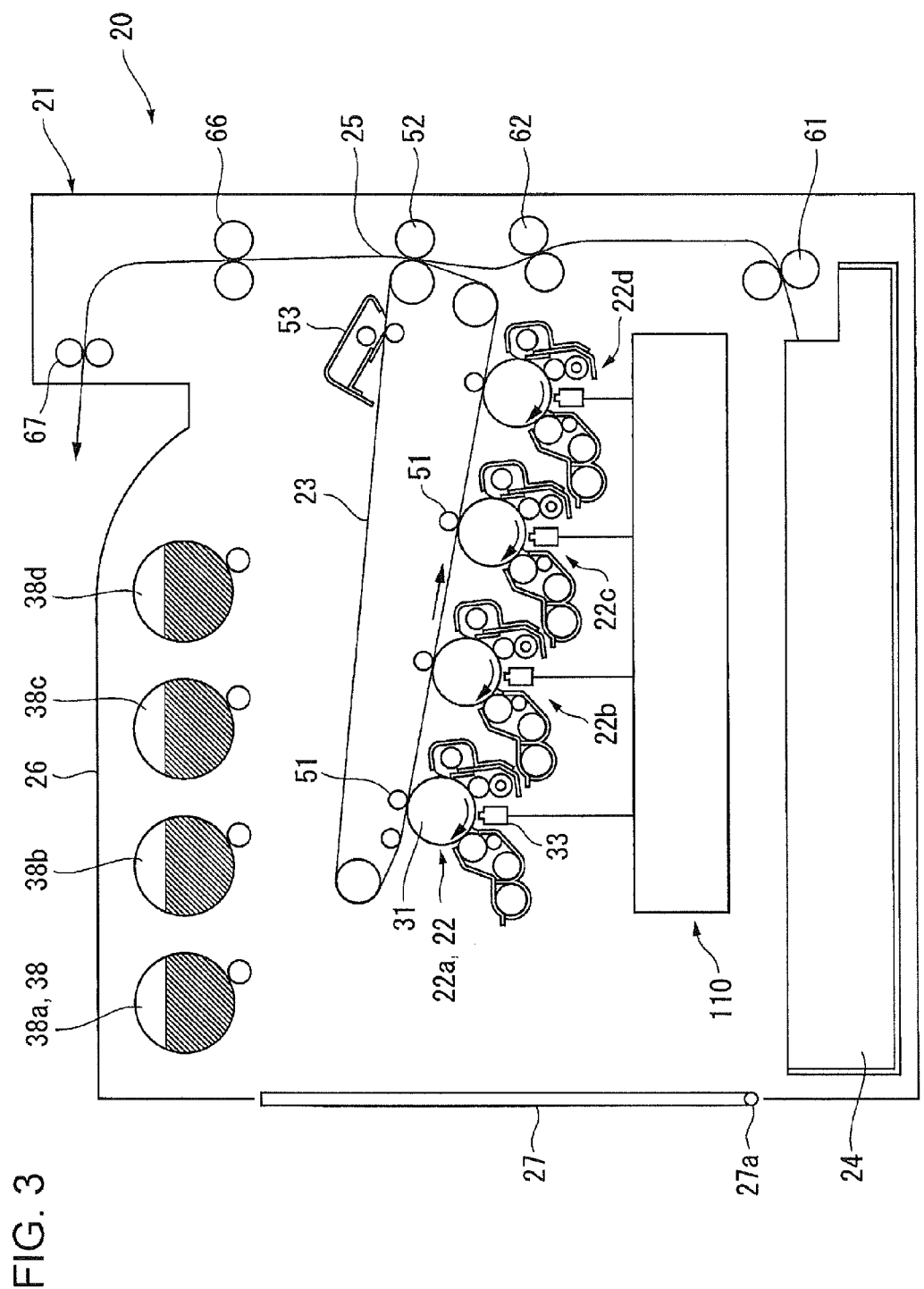
FIG. 3 is an explanatory view illustrating an overall structure of an image forming apparatus according to a first exemplary embodiment.

FIG. 3 illustrates an overall structure of an image forming apparatus according to a first exemplary embodiment.

An image forming apparatus 20 illustrated in FIG. 3 includes image forming units 22 (specifically, 22a to 22d) of four colors (black, yellow, magenta, and cyan according to the present exemplary embodiment), an apparatus housing 21, an intermediate transfer body 23, a recording medium feeding device 24, and a recording medium receiving unit 26. The image forming units 22 are disposed in the apparatus housing 21 in the positional relationship in which the image forming units 22 are arranged side-by-side in a direction slightly inclined downward from the front side to the rear side of the apparatus housing 21. The belt-shaped intermediate transfer body 23, which is rotated in an arrangement direction of the image forming units 22, is disposed above the image forming units 22. The recording medium feeding device 24 is disposed in a lower portion of the apparatus housing 21 and receives a recording medium such that the recording medium may be fed. The recording medium receiving unit 26 is provided in an upper portion of the apparatus housing 21 and receives a recording medium on which an image has been formed output thereto. The recording medium fed from the recording medium feeding device 24 is output to the recording medium receiving unit 26 through a transport path 25 that substantially vertically extends.

Figure 4:
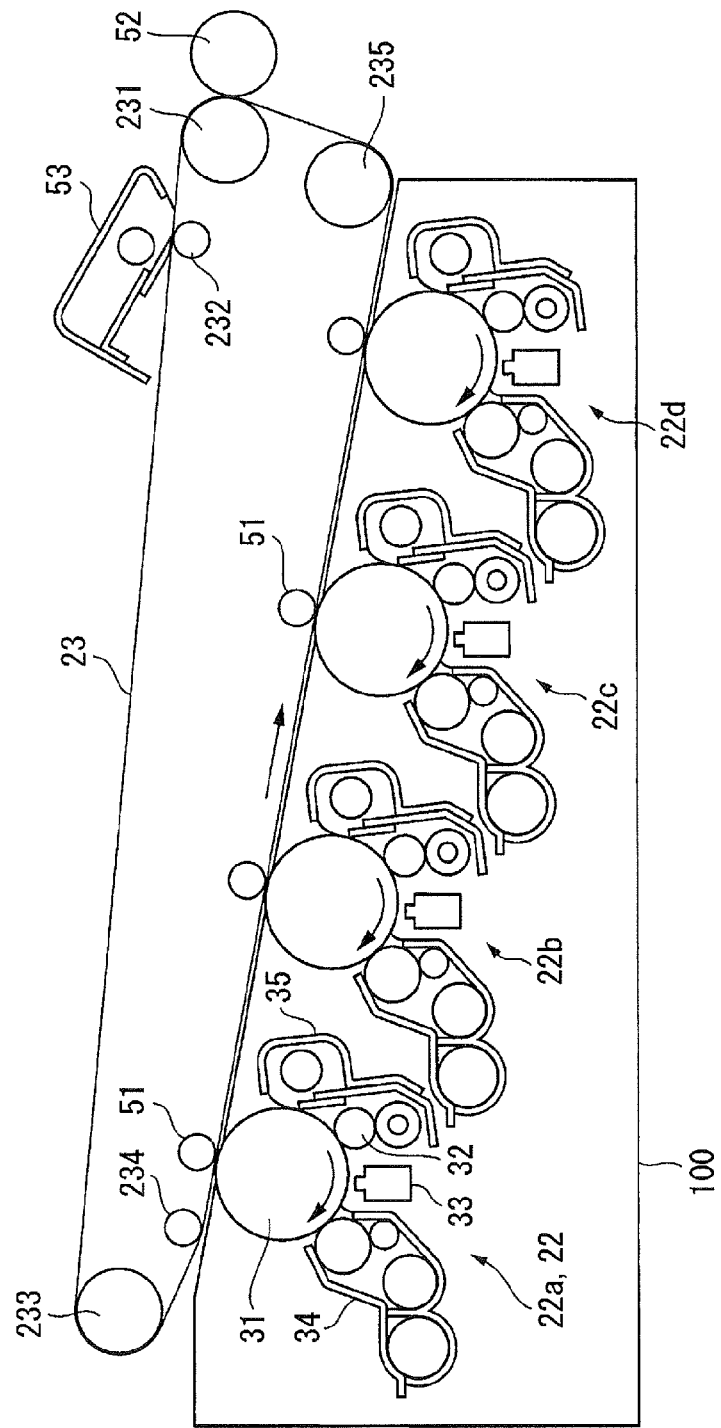
FIG. 4 is an explanatory view illustrating an image forming engine used in the first exemplary embodiment.

As illustrated in FIG. 4, the image forming units 22 (22a to 22d) according to the present exemplary embodiment form, for example, toner images for black, yellow, magenta, and cyan sequentially from the upstream side in the rotational direction of the intermediate transfer body 23 (the colors are not necessarily arranged in this sequence). Each of the image forming units 22 includes, for example, a photosensitive body 31, a charger 32, an image writing device 33, a developing device 34, and a cleaner 35. The photosensitive body 31 has a drum shape. The charger 32 charges the photosensitive body 31 in advance. The image writing device 33 writes an electrostatic latent image onto the photosensitive body 31 having been charged by the charger 32. The developing device 34 visualizes the electrostatic latent image on the photosensitive body 31 with toner of a corresponding one of the colors. The cleaner 35 removes residual toner from the photosensitive body 31.

Here, each of the image writing devices 33 includes an LPH that includes LEDs as light sources arranged in a predetermined pixel pitch. Each of the image writing devices 33 is disposed at a corresponding one of the predetermined write positions ST (see FIG. 5) that faces a corresponding one of the photosensitive bodies 31.

The intermediate transfer body 23 is stretched over stretch rollers 231 to 235 and rotated by, for example, the stretch roller 231 that serves as a drive roller. First transfer devices 51 (for example, a first transfer rollers) are disposed at positions that are on a side of the intermediate transfer body 23 opposite to the photosensitive bodies 31 and that correspond to the photosensitive bodies 31. By applying to these first transfer devices 51 a voltage having a polarity opposite to the polarity to which the toner is charged, the toner images on the photosensitive bodies 31 are electrostatically transferred to the intermediate transfer body 23 side.

Furthermore, a second transfer device 52 (for example, a second transfer roller) is disposed along the intermediate transfer body 23 on the downstream of the image forming unit 22d located on the most downstream side of a moving direction of the intermediate transfer body 23. The second transfer device 52 transfers first transfer images on the intermediate transfer body 23 onto a recording medium through second transfer (collective transfer).

Furthermore, according to the present exemplary embodiment, an intermediate transfer body cleaner 53 is disposed on the downstream of a second transfer region (a region facing the stretch roller 232 in the present example) of the intermediate transfer body 23. The intermediate transfer body cleaner 53 removes the residual toner from the intermediate transfer body 23.

Here, the intermediate transfer body 23 is formed of a resin such as polyimide or polycarbonate or one of a variety of types of rubber containing an appropriate amount of an antistatic agent, so that the volume resistivity of the intermediate transfer body 23 is from about $10^6$ to about $10^{14}$ Ω·cm.

Furthermore, according to the present exemplary embodiment, the recording medium fed through a feeding device 61 of the recording medium feeding device 24 is transported by an appropriate number of transport rollers (not illustrated) along the transport path 25 and registered by a registration roller 62. After that, the recording medium passes through the second transfer region of the second transfer device 52. The unfixed toner images are fixed by, for example, heat and pressure applied by a fixing device 66. Then, the recording medium is output to the recording medium receiving unit 26 through an output roller 67.

Reference numeral 38 (38a to 38d) indicated in FIG. 3 denotes toner replenishing devices (toner cartridges). The toner replenishing devices 38 (38a to 38d) replenishes the developing devices 34 of the image forming units 22 (22a to 22d) with new toner.

Process Cartridges

Figure 5:
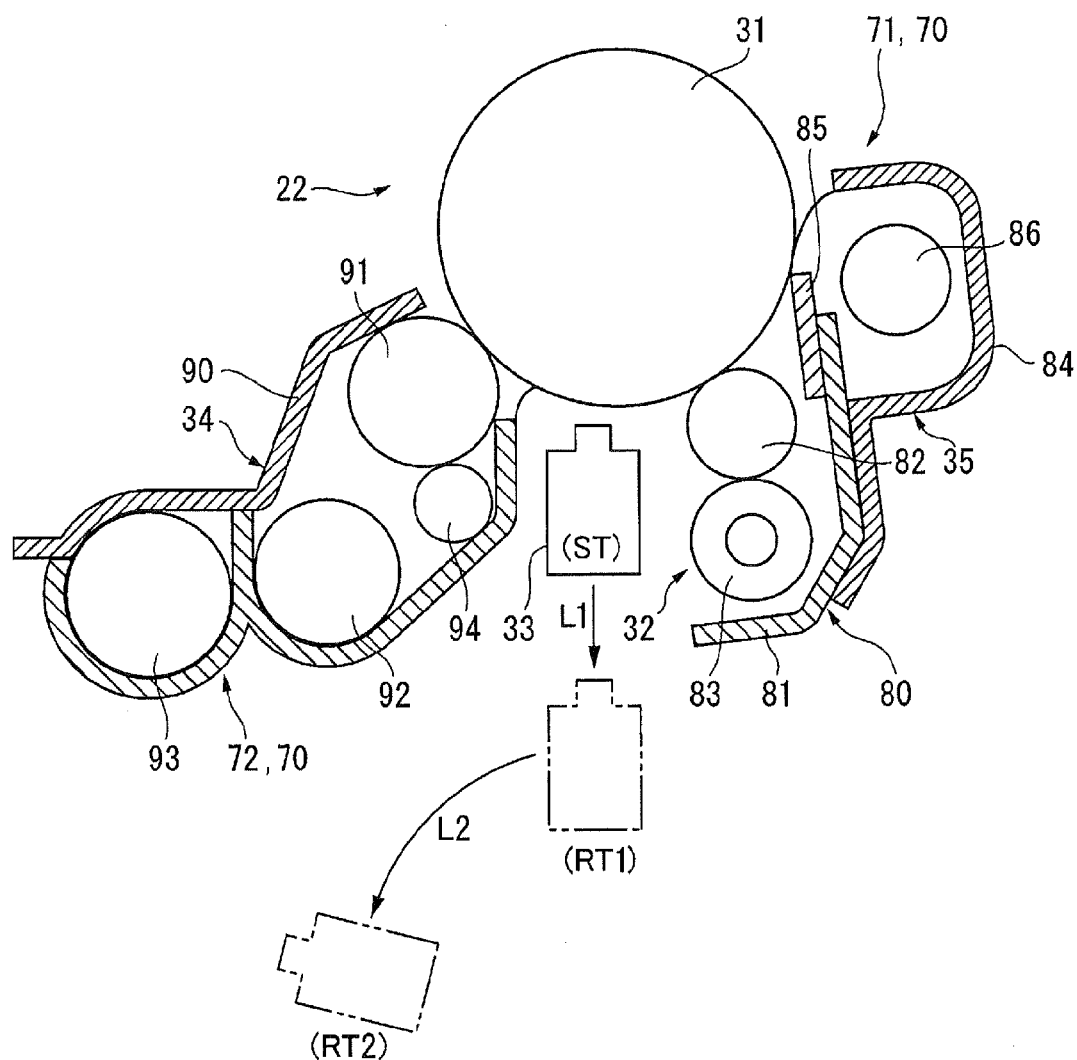
FIG. 5 is an explanatory view illustrating the details of a process cartridge used in the first exemplary embodiment.

According to the present exemplary embodiment, as illustrated in FIGS. 3 to 5, the photosensitive bodies 31 are each integrated into a corresponding one of process cartridges 70 together with the charger 32, the developing device 34, and the cleaner 35. The process cartridges 70 are detachably attached to cartridge receiving portions in the apparatus housing 21 and become parts of the image forming units 22 of respective color components.

Particularly according to the present exemplary embodiment, as illustrated in FIG. 5, each of the process cartridges 70 includes a photosensitive body assembly 71 and a developing assembly 72. The photosensitive body 31 is assembled into the photosensitive body assembly 71. The developing device 34 is assembled into the developing assembly 72, which is swingably connected to the photosensitive body assembly 71.

Photosensitive Body Assemblies

As illustrated in FIG. 5, each of the photosensitive body assemblies 71 includes a casing 80 that houses a corresponding one of the photosensitive body 31. The charger 32 and the cleaner 35 are disposed around the photosensitive body 31 in the casing 80.

Here, the photosensitive body 31 has a rotational shaft, both end portions of which are rotatably supported at both ends of the casing. When the process cartridge 70 is attached, one end of the rotational shaft of the photosensitive body 31 is drivingly connected to a drive mechanism (not illustrated).

The charger 32 includes a charging roller 82 and a power supply roller 83, which are disposed in a charger casing 81 provided in part of the casing 80. The charging roller 82 is in contact with or disposed close to the surface of the photosensitive body 31. The power supply roller 83 supplies power to the charging roller 82.

Also, a cleaner casing 84 is provided in part of the casing 80. The cleaner 35 includes a cleaning member 85 and a collection and transport member 86. The cleaning member 85 having a plate shape is provided on an edge of an opening of the cleaner casing 84 so as to scrape off residual toner on the surface of the photosensitive body 31. The collection and transport member 86 (in the form of, for example, a spiral blade attached around a rotational shaft) is disposed in the cleaner casing 84. The collection and transport member 86 transports the residual toner having been scraped off by the cleaning member 85 toward a collection container (not illustrated).

Developing Assemblies

As illustrated in FIG. 5, each of the developing assemblies 72 includes a developing container 90 that is open to the photosensitive body 31 and contains a two-component developer including a toner and carrier. A developing roller 91 that holds and transports the developer is disposed at a portion of the developing container 90 facing this opening of the developing container 90. Also, a pair of developer agitating members 92 and 93 (each in the form of, for example, a spiral blade attached around a corresponding one of rotational shafts) are disposed on a rear surface side of the developing roller 91 in the developing container 90. Furthermore, a layer thickness regulating member (for example, a layer thickness regulating roller) 94 that regulates the thickness of a layer of the developer held by the developing roller 91 is disposed on the upstream of a developing region of the developing roller 91 in a rotational direction of the developing roller 91.

Movement Table

As illustrated in FIG. 3, according to the present exemplary embodiment, a cover 27 is provided on a front side (corresponding to the left side in FIG. 3) of the apparatus housing 21. The cover 27 is opened and closed about a lower edge of an opening serving as a support pivot 27a.

Furthermore, a movement table 100 is provided in the apparatus housing 21. The movement table 100 is movable in a front-rear direction of the apparatus housing 21, which is a direction in which the photosensitive bodies 31 are arranged. The movement table 100 is held by a guide rail (not illustrated) prepared in the apparatus housing 21 such that the movement table 100 is slidable along the guide rail. In order to reduce skid resistance between the movement table 100 and the guide rail, one or plural rotating members such as rollers may be added according to need.

Furthermore, according to the present exemplary embodiment, as illustrated in FIGS. 3 and 4, the movement table 100 includes the cartridge receiving portions (not illustrated) at positions corresponding to the image forming units 22. The process cartridges 70 of the image forming units 22 are detachably attached to the cartridge receiving portions.

The image writing devices 33 of the image forming units 22 need to be retracted from the write positions ST as will be described later. Thus, spaces that allows a retracting operation of the image writing devices 33 are allocated in the movement table 100.

Figure 6:
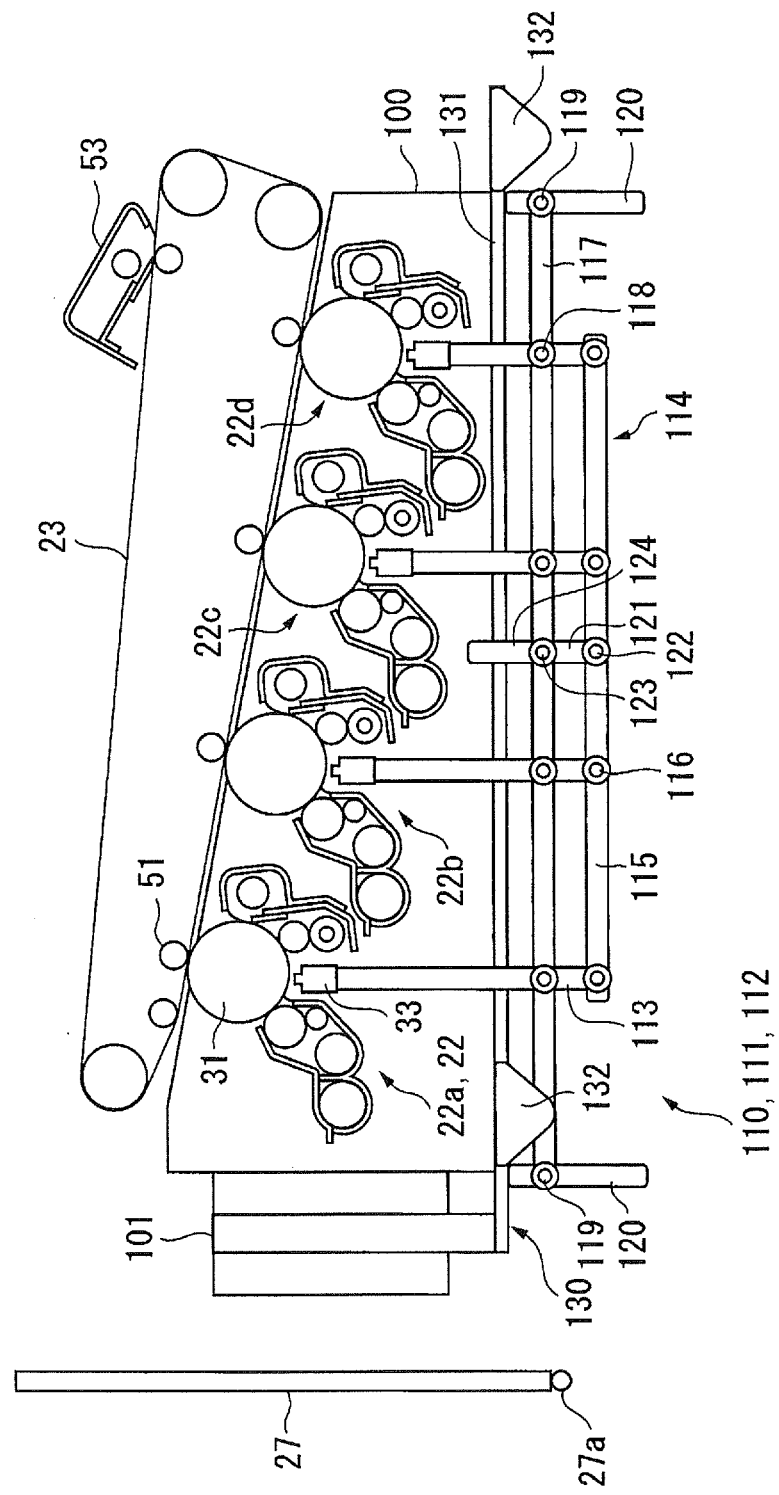
FIG. 6 is an explanatory view illustrating a retractor for the image writing devices used in the first exemplary embodiment.

As illustrated in FIG. 6, the movement table 100 includes a handle 101 for drawing the movement table 100. The handle 101 may be drawn forward over an operational stroke m (see FIG. 7). In a state in which the handle 101 is moved over the operational stroke m, a stopper mechanism of the movement table 100, which retains the movement table 100 at the apparatus housing 21, is released. After that, by drawing the handle 101 forward, the movement table 100 may be drawn.

Retractor

According to the present exemplary embodiment, as illustrated in FIGS. 3 and 6, a retractor 110 is provided between the movement table 100 and the recording medium feeding device 24 in the apparatus housing 21. The retractor 110 retracts the image writing devices 33 when the movement table 100 is moved.

In the present example, particularly as illustrated in FIGS. 5 and 6, the retractor 110 includes a first retracting mechanism 111 and a second retracting mechanism 112. The first retracting mechanism 111 retracts the image writing devices 33 from the respective write positions ST to respective first retracted positions RT1 along respective straight loci L1 extending in the substantially vertical direction, and the second retracting mechanism 112 retracts the image writing devices 33 from the respective first retracted positions RT1 to respective second retracted positions RT2 along respective arc-shaped curved loci L2.

Here, each of the first retracted positions RT1 is preset at a position further away from the photosensitive body 31 than the write position ST in a region not out of a movement region of the movement table 100. Each of the second retracted positions RT2 is preset at a position outside the movement region of the movement table 100 so as not to interfere with the movement of the movement table 100.

The retractor 110 of the present example includes plural support rods 113 and a link mechanism 114. The support rods 113 support the image writing devices 33. The link mechanism 114 advances and retracts the support rods 113 along the straight loci L1 and swings the support rods 113 along the curved loci L2.

In the present example, the write positions ST of the image writing devices 33 are set at positions different from one another in accordance with the positions of the photosensitive bodies 31 of the image forming units 22 (22a to 22d). Thus, the lengths of the support rods 113 are determined so that lower end positions of the support rods 113 are substantially aligned with one another when the image writing devices 33 are positioned at the write positions ST.

The link mechanism 114 extends substantially horizontal direction while crossing the support rods 113 near lower ends of the support rods 113. The link mechanism 114 includes a first connecting rod 115 and a second connecting rod 117. The first connecting rod 115 is rotatably connected to the support rods 113 with pins 116 at positions near the lower ends of the support rods 113. The second connecting rod 117 is provided above the first connecting rod 115 and extends in the substantially horizontal direction. The second connecting rod 117 is rotatably connected to the support rods 113 with pins 118 at intermediate positions of the support rods 113. The second connecting rod 117 is longer than the first connecting rod 115 in the front-rear direction of the apparatus housing 21 and has guide pins 119 at front and rear ends thereof.

The apparatus housing 21 has guide grooves 120 that serve as guides and extend in the vertical direction corresponding to the front and rear guide pins 119 of the second connecting rod 117. The guide pins 119 are movably fitted into the respective guide grooves 120, so that the second connecting rod 117 is movable in the up-down direction.

In the present example, the guide pins 119 are urged upward by an urging spring or urging springs (not illustrated).

Also in the present example, the link mechanism 114 includes a swing arm 121 that is swingable in a direction intersecting the first connecting rod 115 and the second connecting rod 117. This swing arm 121 is rotatably connected to the first connecting rod 115 and the second connecting rod 117 near, for example, substantial centers in the longitudinal direction of the first connecting rod 115 and the second connecting rod 117 with pins 122 and 123. The swing arm 121 has a projecting piece 124 that projects further to the movement table 100 side than the pin 123.

Furthermore, according to the present exemplary embodiment, the retractor 110 performs the retracting operation on the image writing devices 33 by using a coupling mechanism 130, an operation of which is coupled with a drawing operation of the movement table 100.

In the present example, the coupling mechanism 130 includes a coupling rod 131 that is connected to a lower end of the handle 101 of the movement table 100 and extends in the front-rear direction of the apparatus housing 21. The coupling rod 131 has cam members 132 that project downward at the front and rear of the coupling rod 131 so as to have inverted chevron shapes. The cam members 132 are disposed such that, before and after the handle 101 is moved over the operational stroke m, the cam members 132 come to positions where the cam members 132 are not in contact with the guide pins 119 before the handle 101 is moved and the cam members 132 are slid onto the guide pins 119 after the handle 101 has been moved. Thus, by drawing the handle 101 over the operational stroke m, the coupling rod 131 and the cam members 132 move downward the guide pins 119 against the urging spring or the urging springs (not illustrated). As the guide pins 119 are moved downward, the second connecting rod 117 of the retractor 110 is moved downward by a specified amount.

Figure 8:
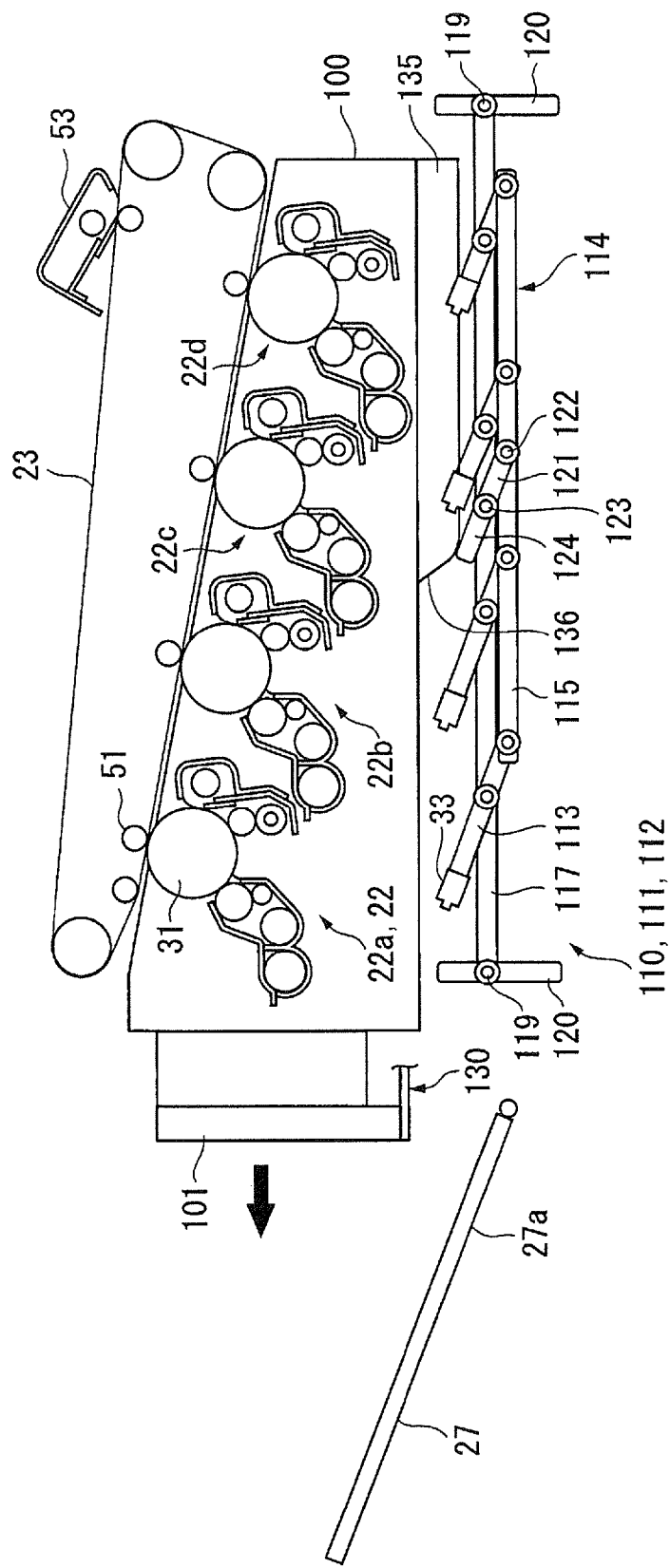
FIG. 8 is an explanatory view illustrating a second retracting operation process of the retractor for the image writing devices used in the first exemplary embodiment.

Also in the present example, the coupling mechanism 130 includes a rib 135 (see FIG. 8). The rib 135 is provided on a lower surface of the movement table 100 and brought into contact with the projecting piece 124 of the swing arm 121 immediately after the movement table 100 is drawn from a regular position of the movement table 100 set in the apparatus housing 21 when the handle 101 is held to draw the movement table 100. The rib 135 is an elongated projection continuously extending rearward from a position near the substantial center in the front-rear direction in the lower surface of the movement table 100. The rib 135 has an inclined portion 136 at an end portion on the swing arm 121 side. The inclination of the inclined portion 136 follows a direction in which the swing arm 121 is swung downward. Thus, the swing arm 121 is easily swung downward when the swing arm 121 is brought into contact with the rib 135.

When this rib 135 is brought into contact with the swing arm 121, the rib 135 swings the swing arm 121 about the pin 123, which connects the swing arm 121 to the second connecting rod 117, to a position where the swing arm 121 is swung to assume a substantially swung down position. The swing arm 121 swung as described above substantially horizontally moves the first connecting rod 115 relative to the second connecting rod 117 toward the rear side of the apparatus housing 21. Along with this movement of the first connecting rod 115, the support rods 113 for the respective image writing devices 33 are swung.

Operations of the Image Forming Apparatus

Initially, operations of the image forming apparatus according to the present exemplary embodiment will are described.

When the image forming apparatus 20 is in a state in which the image forming apparatus 20 may form an image, as illustrated in FIGS. 3 and 6, the process cartridges 70 of the image forming units 22 (22a to 22d) are attached to the respective cartridge receiving portions of the movement table 100. Also in this state in this example, the image writing devices 33 are positioned at positioning portions prepared in the respective process cartridges 70 and the positions relative to photosensitive bodies 31 are set at the predetermined respective write positions ST.

In this state, electrostatic latent images of the respective color components are written onto the photosensitive bodies 31 of the respective image forming units 22 by the image writing devices 33, and then, toner images of the respective color components are formed by the developing device 34 and transferred onto the intermediate transfer body 23 through first transfer by using the first transfer devices 51. After that, the toner images of the respective color components having been transferred onto the intermediate transfer body 23 through first transfer are transferred onto the recording medium through second transfer by using the second transfer device 52. This recording medium passes through the fixing device 66 and is output to the recording medium receiving unit 26.

Replacement of the Process Cartridges

Next, an operational procedure of replacement of the process cartridges attached to the image forming apparatus is described.

The process cartridges 70 may be replaced as follows: that is, initially, the cover 27 of the apparatus housing 21 is opened; then, the movement table 100 is drawn through the opening in the cover 27; and the process cartridge 70 or the process cartridges 70 attached to the movement table 100 are removed.

At this time, according to the present exemplary embodiment, when the movement table 100 is drawn, the retractor 110 retracts the image writing devices 33 of the image forming units 22 to the outside of the movement region of the movement table 100. Thus, the movement table 100 may be smoothly drawn.

Here, the retracting operation performed on the image writing devices 33 by the retractor 110 is described.

Figure 7:
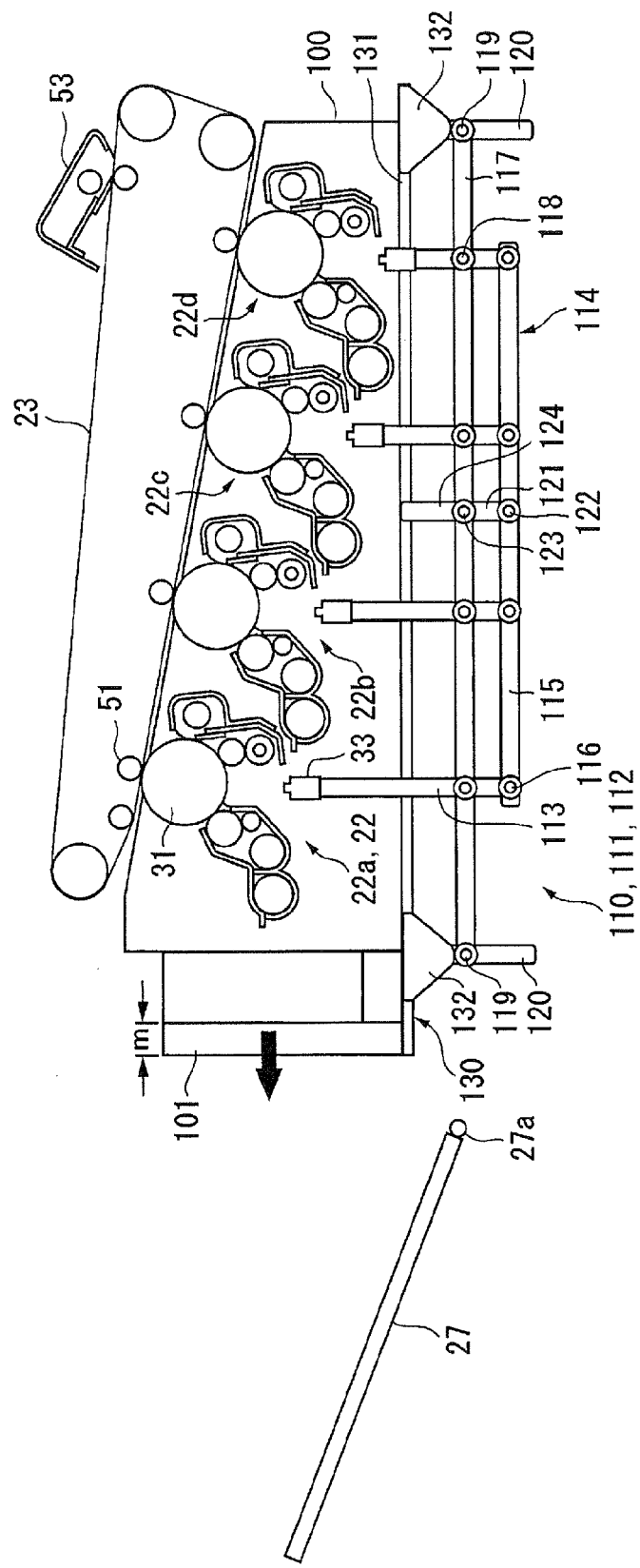
FIG. 7 is an explanatory view illustrating a first retracting operation process of the retractor for the image writing devices used in the first exemplary embodiment.

In the present example, as illustrated in FIGS. 6 and 7, when the cover 27 of the apparatus housing 21 is opened, the retracting operation is not performed on the image writing devices 33 by the retractor 110. The retracting operation is performed on the image writing devices 33 by the retractor 110 along with the drawing operation performed on the movement table 100.

In order to draw the movement table 100, the handle 101 is initially drawn forward over the specified stroke m.

In this state, the coupling rod 131 of the coupling mechanism 130 is moved to the cover 27 side, and along with this movement, the cam members 132 are moved onto the guide pins 119 of the second connecting rod 117, which is an element of the link mechanism 114 of the retractor 110, and press downward the guide pins 119. As a result, by moving downward the second connecting rod 117 by a specified amount, the support rods 113 are moved downward by a specified amount together with the second connecting rod 117. Thus, as illustrated in FIGS. 6 and 7, each of the image writing devices 33 is moved downward from a corresponding one of the photosensitive bodies 31 through the straight locus L1 from the write position ST to the first retracted position RT1.

At this time, the retractor 110 functions as the first retracting mechanism 111 so as to retract the image writing devices 33 from the respective write positions ST to the respective first retracted positions RT1 through the respective straight loci L1.

After that, by holding the handle 101 of the movement table 100 and further drawing the movement table 100, the rib 135 of the coupling mechanism 130 is moved together with the movement table 100, brought into contact with the swing arm 121, which is an element of the link mechanism 114, and swings the swing arm 121 so that the swing arm 121 is moved to assumes the substantially swung down position. Along with a swinging operation of the swing arm 121, the first connecting rod 115 is substantially horizontally moved to the rear side of the apparatus housing 21 relative to the second connecting rod 117. This causes the support rods 113, which are connected to the first connecting rod 115 with the pins 116 and the second connecting rod 117 with the pins 118, to swing similarly to the swing arm 121 and moved to assume respective substantially swung down positions. Thus, as illustrated in FIGS. 7 and 8, the image writing devices 33 are retracted from the respective first retracted positions RT1 to the respective second retracted positions RT2 through the respective curved loci L2.

The second retracted positions RT2 are set below and outside the movement region of the movement table 100. While drawing the movement table 100 to a position which is a furthest position to which the movement table 100 may be drawn from the apparatus housing 21, a longitudinally extending portion of the rib 135 of the coupling mechanism 130 continues to press the swing arm 121 in its swung down position. Thus, the image writing devices 33 are maintained at the respective second retracted positions RT2.

At this time, the retractor 110 functions as the second retracting mechanism 112 so as to retract the image writing devices 33 from the respective first retracted positions RT1 to the respective second retracted positions RT2 through the respective curved loci L2.

After the movement table 100 has been drawn from the apparatus housing 21 as described above, the user may replace the old process cartridge 70 or the old process cartridges 70 attached to the movement table 100.

Particularly in the present example, the retracting operation performed by the retractor 110 is coupled with the drawing operation of the movement table 100. Thus, the retractor 110 performs the retracting operation on the image writing devices 33 by an inertial force of the movement table 100. Accordingly, an operational force applied by the user to the retractor 110 may be comparatively small.

When the process cartridge 70 or the process cartridges 70 have been replaced, the user may press the movement table 100 into a specified set position in the apparatus housing 21.

At this time, when the movement table 100 is returned to the specified set position, the swing arm 121 of the retractor 110 is disengaged from the rib 135 of the movement table 100. This causes the swing arm 121 to rise due to the positional relationship restrained by the link mechanism 114, and accordingly, the image writing devices 33 are returned from the respective second retracted positions RT2 to the respective first retracted positions RT1 through the respective curved loci L2.

At this stage, by returning the handle 101 to an original initial position, the coupling rod 131 of the coupling mechanism 130 is moved to the rear side of the apparatus housing 21, thereby disengaging the cam members 132 from the second connecting rod 117 of the retractor 110. Thus, the second connecting rod 117 of the retractor 110 is moved upward by being urged by an urging spring (not illustrated), and accordingly, the support rods 113 are moved upward.

In this state, the image writing devices 33 are returned from the respective first retracted positions RT1 to the photosensitive body 31 side through the respective straight loci L1, positioned at the positioning portions of the respective process cartridges 70, and set at the respective write positions ST.

Second Exemplary Embodiment

Figure 9:
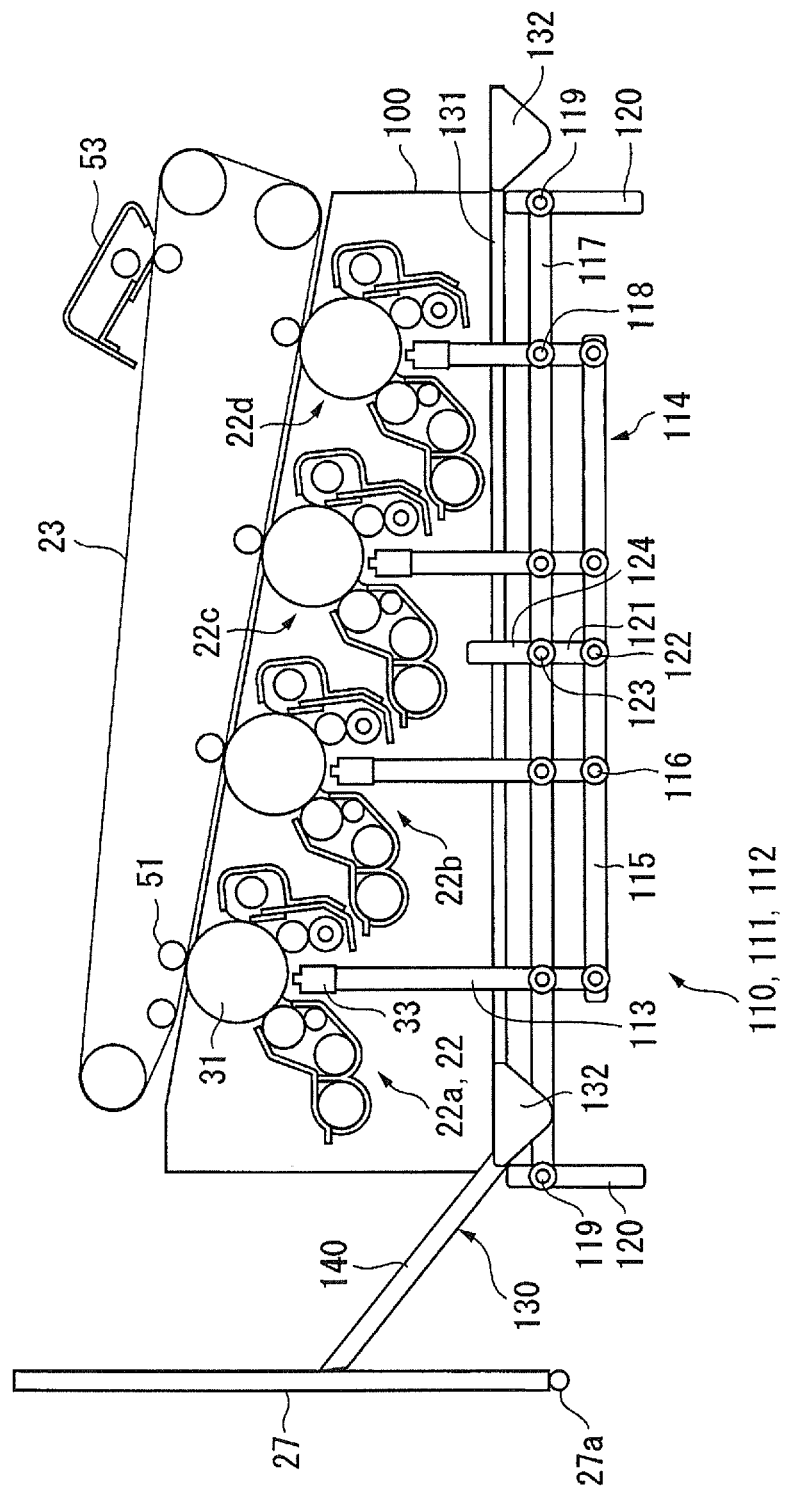
FIG. 9 is an explanatory view illustrating a retractor for the image writing devices used in an image forming apparatus according to a second exemplary embodiment.

FIG. 9 is an explanatory view of part of the image forming apparatus according to a second exemplary embodiment.

Although a basic structure of the image forming apparatus illustrated in FIG. 9 is similar to that of the first exemplary embodiment, the retractor 110, a coupling method of which is different from that of the first exemplary embodiment, is adopted. The element the same as or similar to those of the first exemplary embodiment are denoted by the same or similar reference numerals as those of the first exemplary embodiment and detailed description thereof is omitted here.

In this example, a basic structure of the retractor 110 is similar to that of the first exemplary embodiment.

Figure 10:
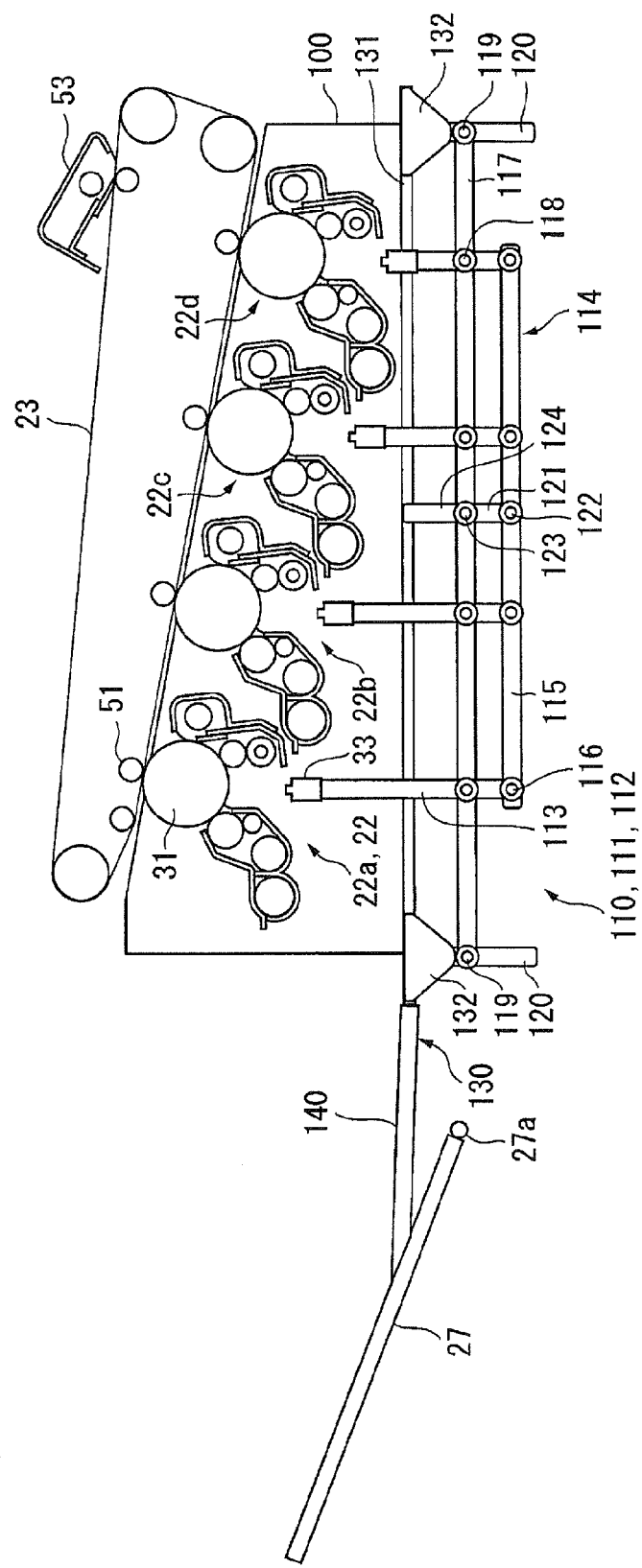
FIG. 10 is an explanatory view illustrating a first retracting operation process of the retractor for the image writing devices used in the second exemplary embodiment.

As is the case with the coupling mechanism 130 of the first exemplary embodiment, the coupling mechanism 130 of the present example includes the coupling rod 131, the cam members 132, and the rib 135. However, as illustrated in FIGS. 9 and 10, the coupling rod 131 and the cam members 132 of the coupling mechanism 130 are provided with a coupling arm 140, an operation of which is coupled with the opening operation of the cover 27 instead of an operation of the handle of the movement table 100. This coupling arm 140 connects, for example, a portion of the cover 27 away from the support pivot 27a to an end of the coupling rod 131 on the cover 27 side with pins. As the cover 27 is opened, the coupling arm 140 changes its position by following the cover 27, moves forward the coupling rod 131 to the cover 27 side, and moves the cam members 132 of the coupling rod 131 to the guide pin 119 positions. This causes the guide pins 119 to be pressed downward, thereby pressing downward the second connecting rod 117. Thus, the image writing devices 33 are retracted to the respective first retracted positions RT1 by using the support rods 113.

Figure 11:
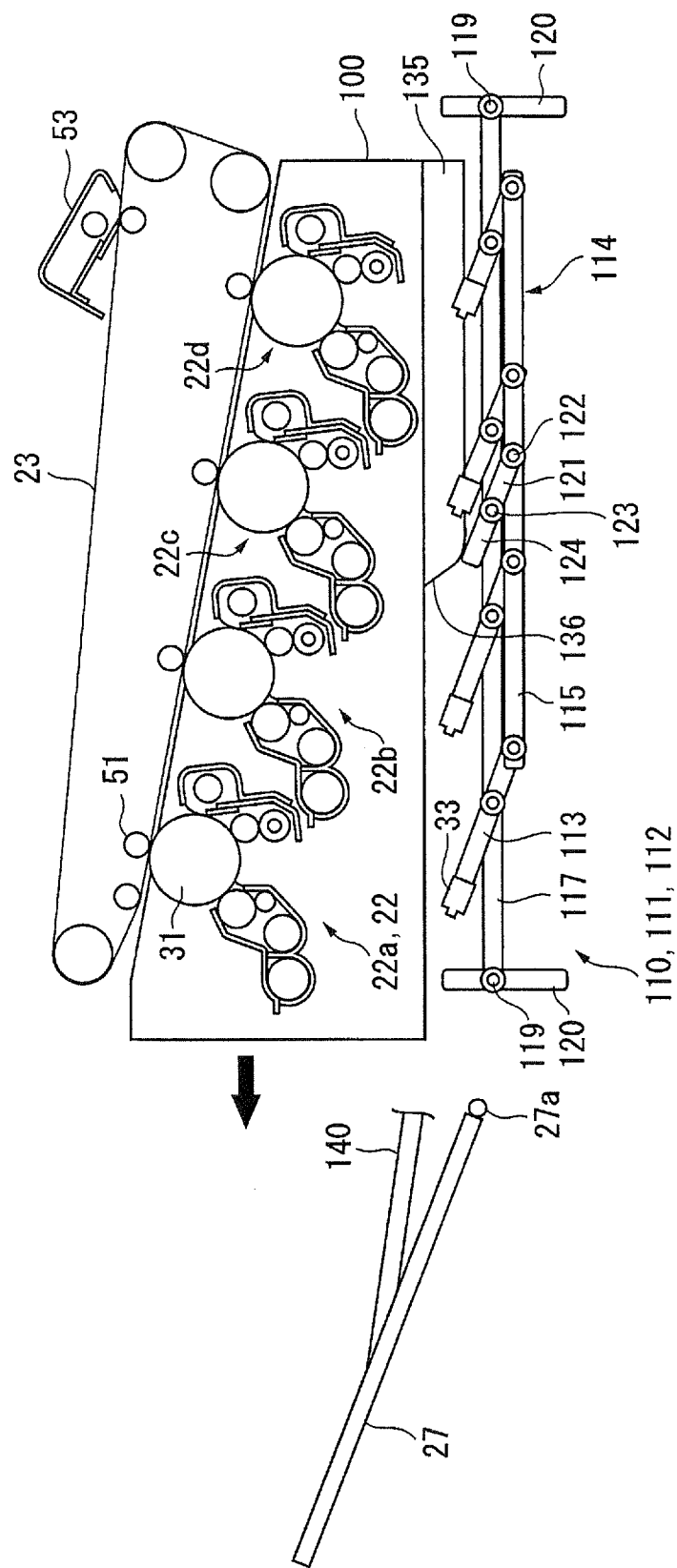
FIG. 11 is an explanatory view illustrating a second retracting operation process of the retractor for the image writing devices used in the second exemplary embodiment.

Therefore, according to the present exemplary embodiment, as illustrated in FIGS. 9 to 11, unlike the first exemplary embodiment, in accordance with the opening operation of the cover 27, the image writing devices 33 are retracted from the respective write positions ST to the respective first retracted positions RT1 through the respective straight loci L1. After that, similarly to the first exemplary embodiment, the image writing devices 33 are retracted from the respective first retracted positions RT1 to the respective second retracted positions RT2 through the respective curved loci L2 in accordance with the drawing operation of the movement table 100.

Third Exemplary Embodiment

Figure 12:
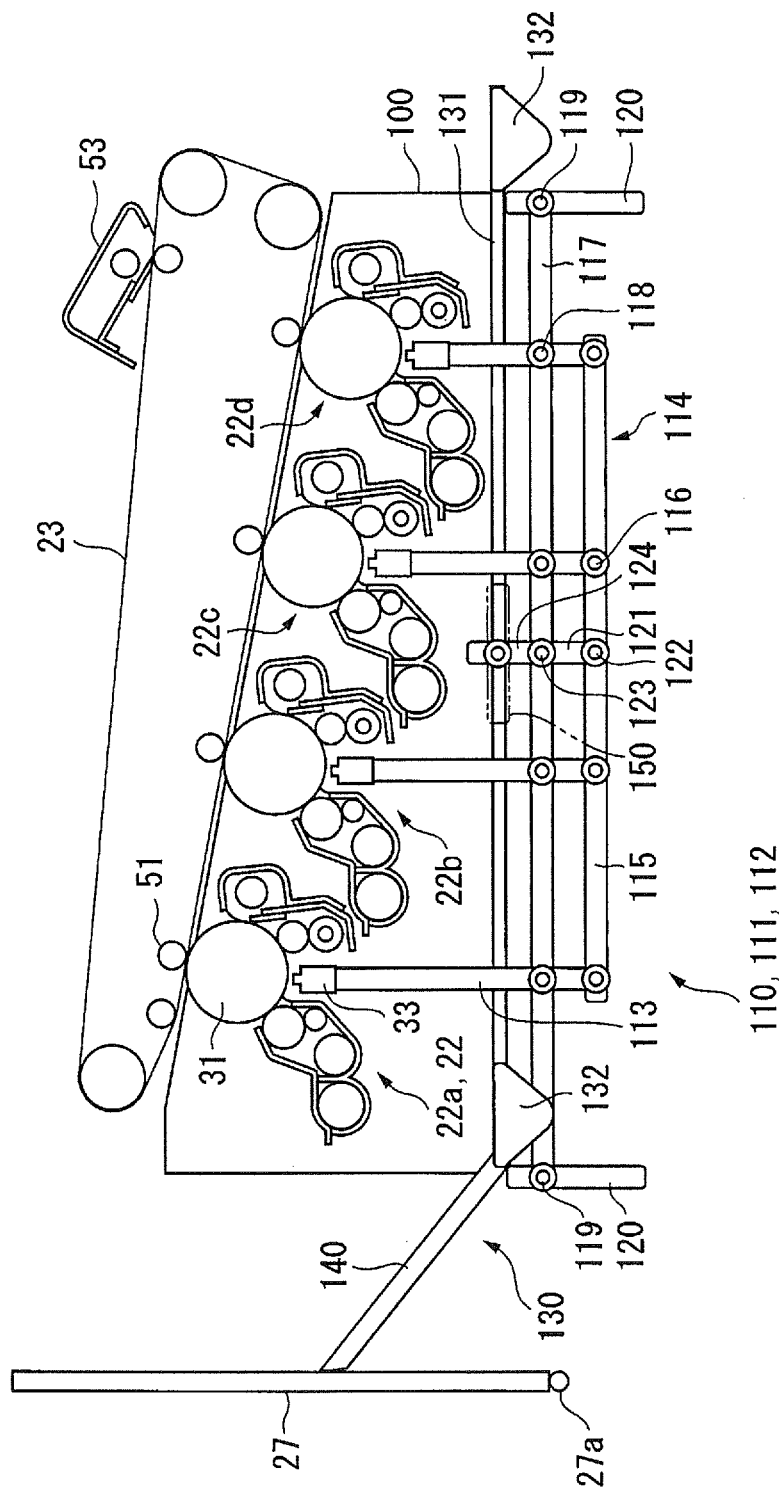
FIG. 12 is an explanatory view illustrating a retractor for the image writing devices used in an image forming apparatus according to a third exemplary embodiment.

FIG. 12 is an explanatory view of part of the image forming apparatus according to a third exemplary embodiment.

Although a basic structure of the image forming apparatus illustrated in FIG. 12 is similar to that of the first exemplary embodiment, the retractor 110, a coupling method of which is different from that of the first or second exemplary embodiment, is adopted. The element the same as or similar to those of the first exemplary embodiment are denoted by the same or similar reference numerals as those of the first exemplary embodiment and detailed description thereof is omitted here.

In this example, a basic structure of the retractor 110 is similar to that of the first exemplary embodiment.

Figure 14:
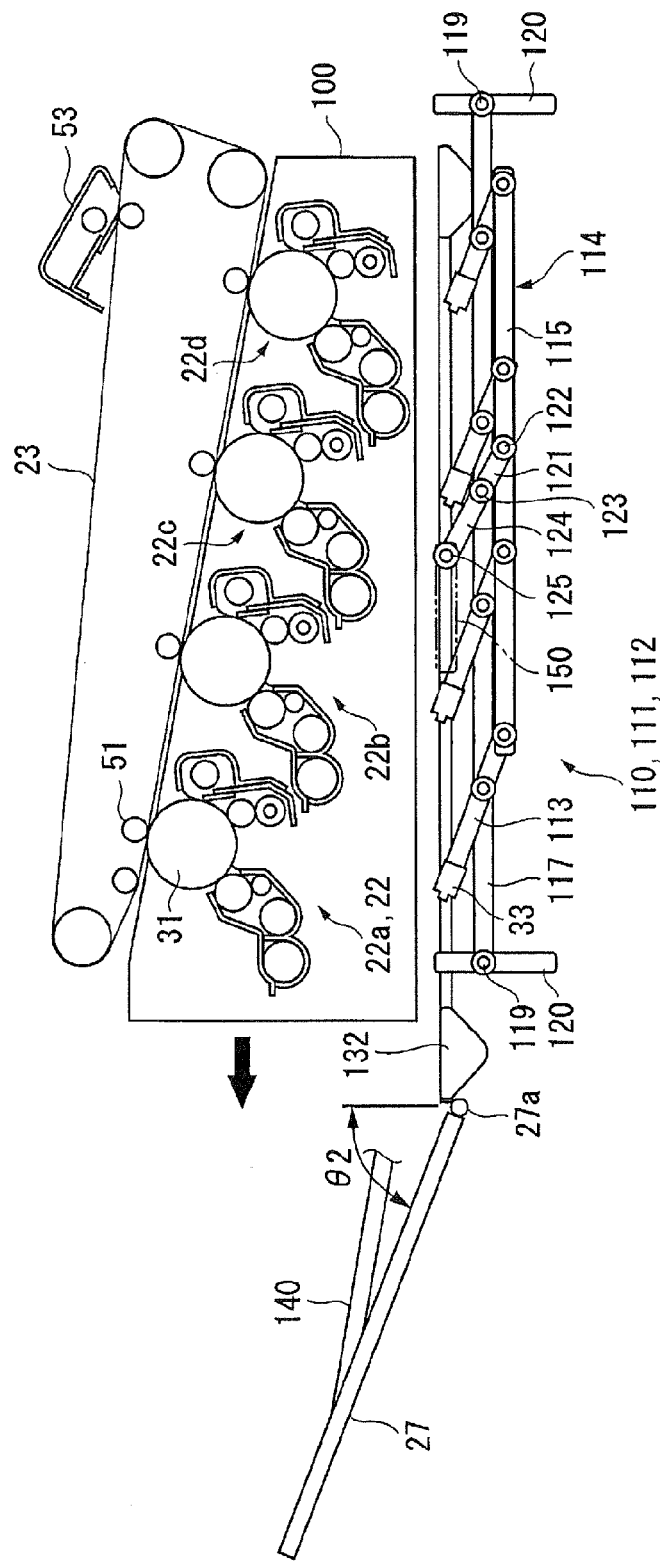
FIG. 14 is an explanatory view illustrating a second retracting operation process of the retractor for the image writing devices used in the third exemplary embodiment.

As is the case with the coupling mechanism 130 of the first exemplary embodiment, the coupling mechanism 130 of the present example includes the coupling rod 131 and the cam members 132. However, unlike the first exemplary embodiment, as illustrated in FIGS. 12 and 14, the coupling rod 131 and the cam members 132 are provided with the coupling arm 140, the operation of which is coupled with the opening operation of the cover 27. This coupling arm 140 connects, for example, a portion of the cover 27 away from the support pivot 27a and the end of the coupling rod 131 on the cover 27 side to each other with pins. As the cover 27 is opened, the coupling arm 140 changes its position by following the cover 27, and moves forward the coupling rod 131 to the cover 27 side.

Furthermore, unlike the first and second exemplary embodiments, the coupling mechanism 130 of the present example does not have the rib 135 on the movement table 100. Instead, in order to engage the coupling rod 131 and the swing arm 121 with each other, the coupling rod 131 or a member secured to the coupling rod 131 has a long hole 150 elongated in the longitudinal direction. A hook pin 125 provided on the projecting piece 124 of the swing arm 121 is slidably fitted into this long hole 150.

Here, when the swing arm 121 is in the risen state, the hook pin 125 is positioned at an initial position in the middle of the long hole 150 of the coupling rod 131. A movement stroke over which the coupling rod 131 moves as the opening operation of the cover 27 is performed is set to be longer than a span s between the initial position of the hook pin 125 and the end position of the long hole 150.

Next, the retracting operation of the image writing devices by using the retractor according to the present exemplary embodiment is described.

Figure 13:
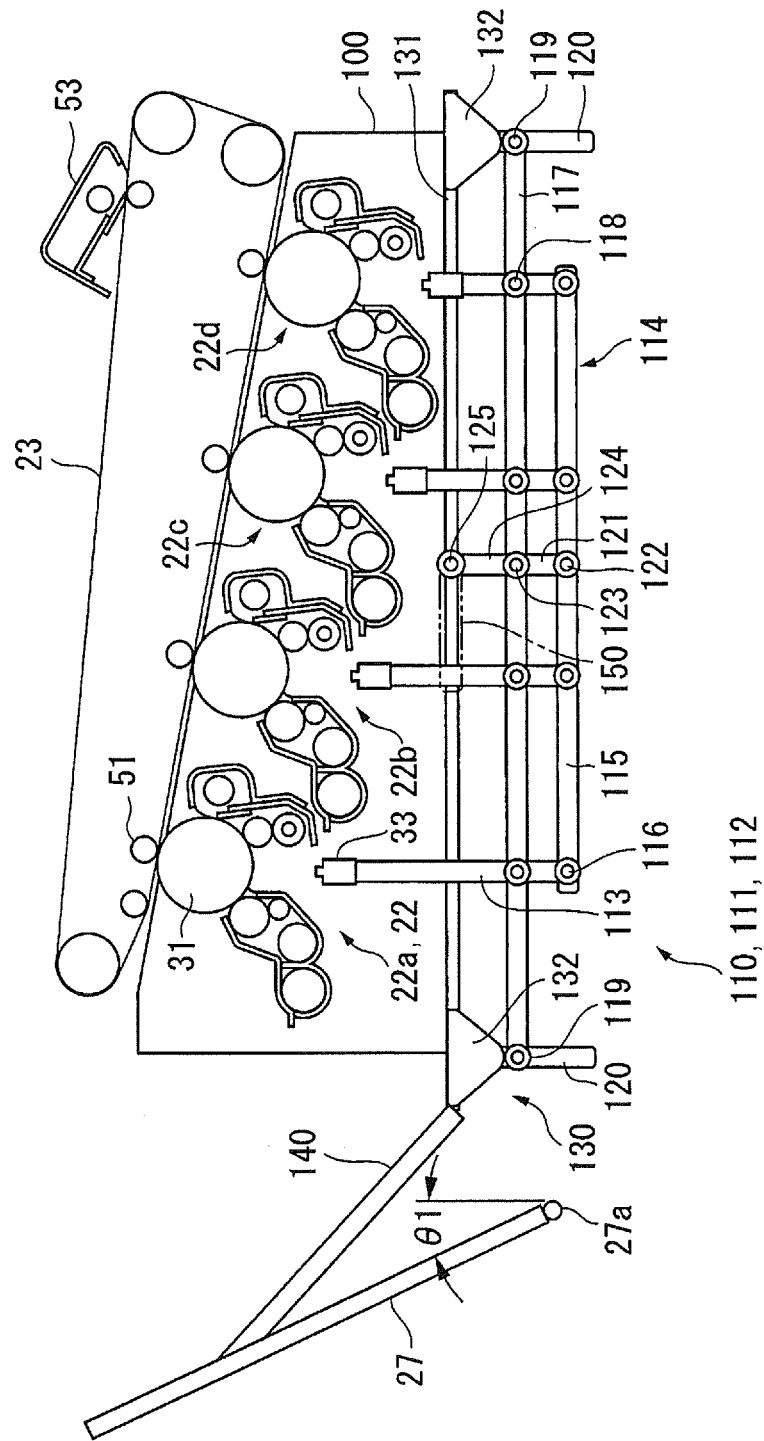
FIG. 13 is an explanatory view illustrating a first retracting operation process of the retractor for the image writing devices used in the third exemplary embodiment.

Initially, as illustrated in FIGS. 12 and 13, when the cover 27 of the apparatus housing 21 is partially opened, the coupling rod 131 follows the cover 27 so as to be moved forward to the cover 27 side by using the coupling arm 140.

In this state, the cam members 132 of the coupling rod 131 are moved to the guide pin 119 positions and press downward the guide pins 119, thereby pressing downward the second connecting rod 117. This retracts the image writing devices 33 to the respective first retracted positions RT1 by using the respective support rods 113.

At this time, as the coupling rod 131 is moved forward, the hook pin 125 of the swing arm 121 is relatively moved along the long hole 150 and reaches the end position of the long hole 150. Thus, even when the cover 27 is opened by angle θ1, the swing arm 121 of the retractor 110 is not swung.

After that, as illustrated in FIGS. 13 and 14, the cover 27 is further opened. When the cover 27 is opened by a maximum angle θ2 (θ2>θ1) illustrated in FIG. 14, the coupling rod 131 is further moved forward to the cover 27 side by using the coupling arm 140 that follows the cover 27.

In this state, the hook pin 125 of the swing arm 121 is positioned at the end position of the long hole 150 of the coupling rod 131. Thus, as the coupling rod 131 is moved forward, the swing arm 121 is swung about the pin 122 and moved to assume the substantially swung down position. Furthermore, as the swinging operation of the swing arm 121 is performed, the first connecting rod 115 is substantially horizontally moved to the rear side of the apparatus housing 21 relative to the second connecting rod 117. This causes the support rods 113, which are connected to the first connecting rod 115 with the pins 116 and the second connecting rod 117 with the pins 118, to swing similarly to the swing arm 121 and moved to assume respective substantially swung down positions. Thus, as illustrated in FIGS. 13 and 14, the image writing devices 33 are retracted from the respective first retracted positions RT1 to the respective second retracted positions RT2 through the respective curved loci L2.

As described above, according to the present exemplary embodiment, as illustrated in FIGS. 12 to 14, unlike the first and second exemplary embodiments, the image writing devices 33 are retracted from the respective write positions ST to the respective first retracted positions RT1 through the respective straight loci L1 such that the retracting of the image writing devices 33 is coupled with the opening operation of the cover 27. After that, the image writing devices 33 are retracted from the respective first retracted positions RT1 to the respective second retracted positions RT2 through the respective curved loci L2.

In this state, even when the movement table 100 is drawn from the apparatus housing 21, the image writing devices 33 do not interfere with the movement table 100. The process cartridge 70 or the process cartridges 70 may be replaced after the movement table 100 has been drawn.

First Comparative Example

Figure 15A:
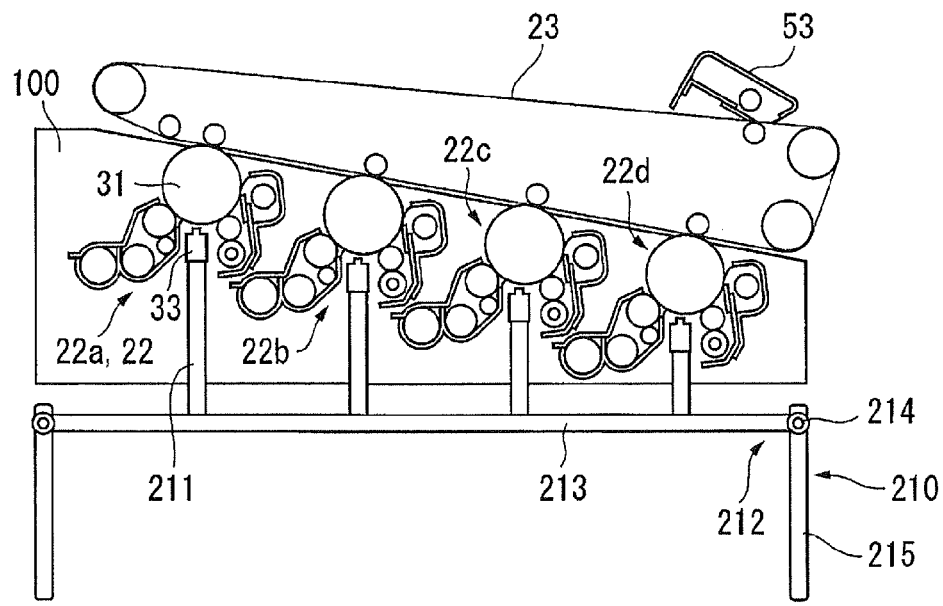
FIG. 15A is an explanatory view illustrating a retractor for the image writing devices used in an image forming apparatus of a first comparative example.
Figure 15B:
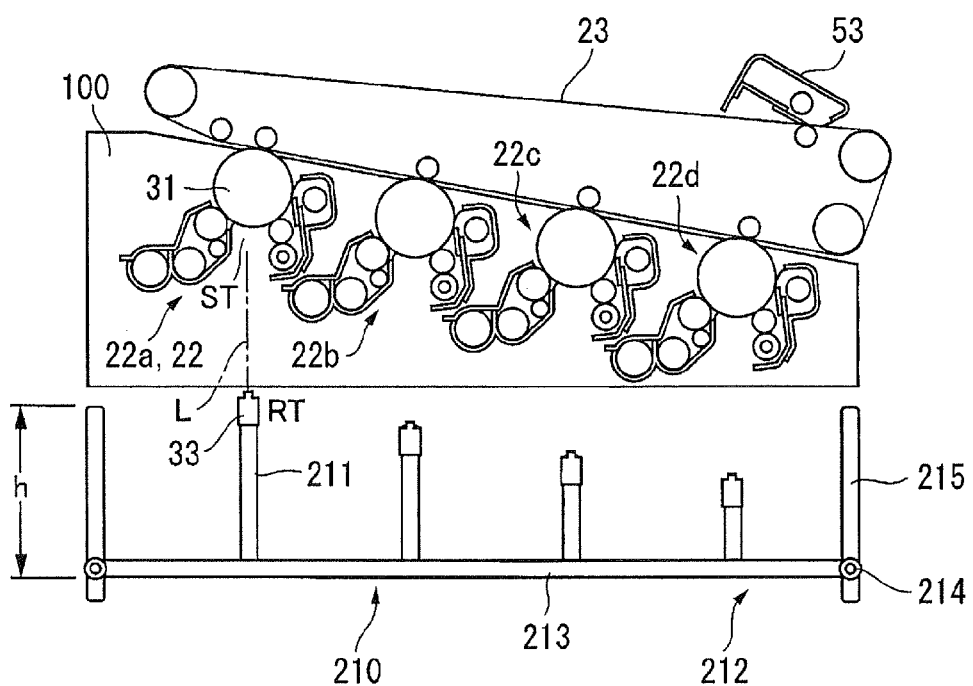
FIG. 15B is an explanatory view illustrating a retracting operation process of the retractor for the image writing devices of the first comparative example.

FIGS. 15A and 15B illustrate part of an image forming apparatus of a first comparative example.

Although a basic structure of the image forming apparatus illustrated in FIGS. 15A and 15B is similar to that of the first exemplary embodiment, a retractor 210 for the image writing devices 33, which is different from that of the first exemplary embodiment, are adopted. The element the same as or similar to those of the first exemplary embodiment are denoted by the same or similar reference numerals as those of the first exemplary embodiment and detailed description thereof is omitted here. This is also applicable to second and third comparative examples which will be described.

The retractor 210 of this example includes plural support rods 211 and a link mechanism 212. The support rods 211 support the image writing devices 33. The link mechanism 212 advances and retracts the support rods 211 along a straight loci L.

Here, the link mechanism 212 extends in the substantially horizontal direction while crossing the support rods 211 near lower ends of the support rods 211. The link mechanism 212 includes a connecting rod 213 to which parts of the support rods 211 near lower ends of the support rods 211 are connected and secured. Guide pins 214 are provided at front and rear ends of the connecting rod 213. The apparatus housing 21 has guide grooves 215 that serve as guides and extend in the vertical direction corresponding to the front and rear guide pins 214 of the connecting rod 213. The guide pins 214 are movably fitted into the respective guide grooves 215, so that the connecting rod 213 is movable in the up-down direction.

The retractor 210 of the present example retracts the image writing devices 33 from the respective write positions ST to respective retracted positions RT trough the respective straight loci L. Thus, in order to maintain a movement stroke h to positions outside the movement region of the movement table 100, an arrangement space for the retractor 210 in the up-down direction may be increased.

Particularly, as is the case with the present example in which the image forming units 22 (22a to 22d) are disposed in such a form that the image forming units 22 are arranged in an inclined direction, the movement stroke of the retractor 210 for the image writing device 33 of the uppermost image forming unit 22 (22a in the present example) may increase compared to a form in which the image forming units 22 are substantially horizontally arranged.

Second Comparative Example

Figure 16A:
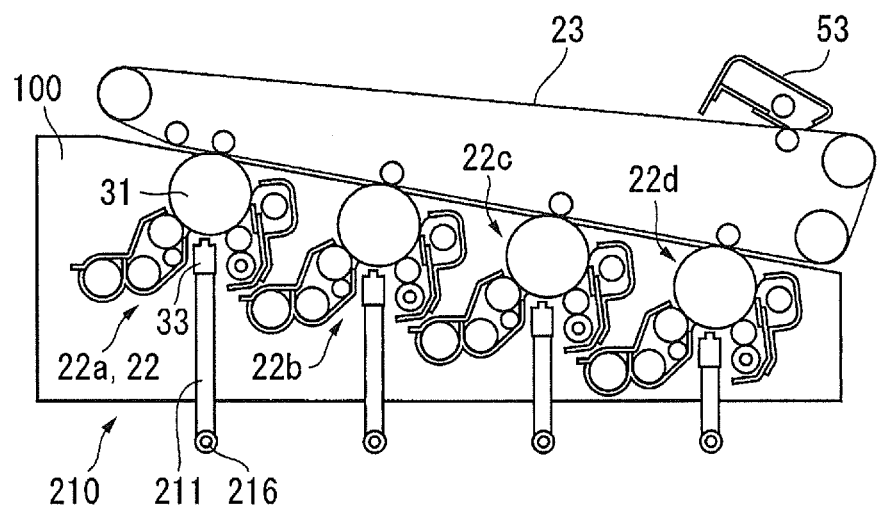
FIG. 16A is an explanatory view illustrating a retractor for the image writing devices used in an image forming apparatus of a second comparative example.
Figure 16B:
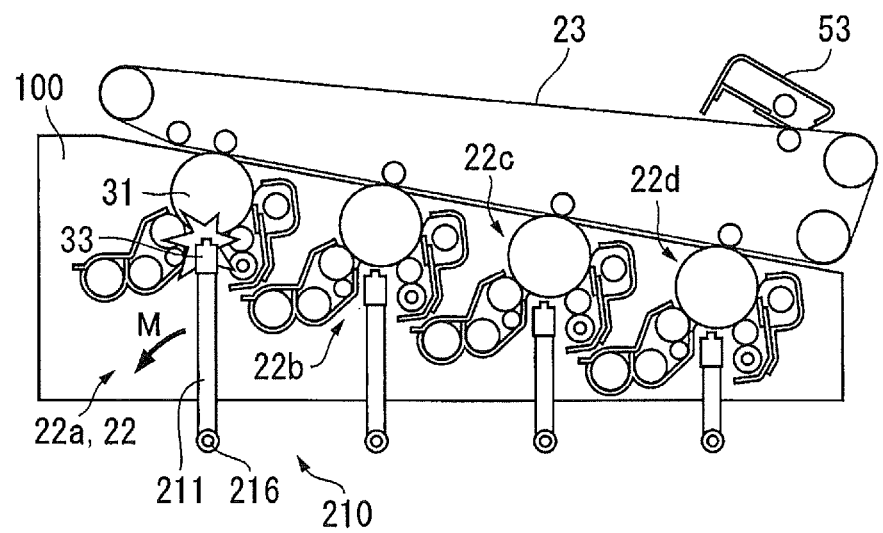
FIG. 16B is an explanatory view illustrating a problem that may occur in a retracting operation process of the retractor for the image writing devices of the second comparative example.

FIGS. 16A and 16B illustrate part of an image forming apparatus of a second comparative example.

Although a basic structure of the image forming apparatus illustrated in FIGS. 16A and 16B is similar to that of the first exemplary embodiment, the retractor 210 for the image writing devices 33, which is different from that of the first exemplary embodiment, is adopted.

The retractor 210 of this example includes plural support rods 211 and swing mechanisms 216. The support rods 211 support the image writing devices 33. The swing mechanisms 216 swing the support rods 211 along respective rotational loci M.

In the case of the present example, the image writing devices 33 of the image forming units 22 are disposed near the respective photosensitive bodies 31. Thus, as illustrated in FIG. 16B, an attempt of retracting the image writing devices 33 by rotating the image writing devices 33 may cause the image writing devices 33 to interfere with components of the image forming units 22 around the image writing devices 33 without large spaces allocated around the image writing devices 33.

It is assumed that large spaces are allocated around the image writing devices 33. Even in this case, as long as a method in which the image writing devices 33 are retracted by rotation is used, the positions where the image writing devices 33 are disposed relative to the respective photosensitive bodies 31 may be easily deviated from regular positions when the image writing devices 33 are returned to the respective write positions ST.

Third Comparative Example

Figure 17A:
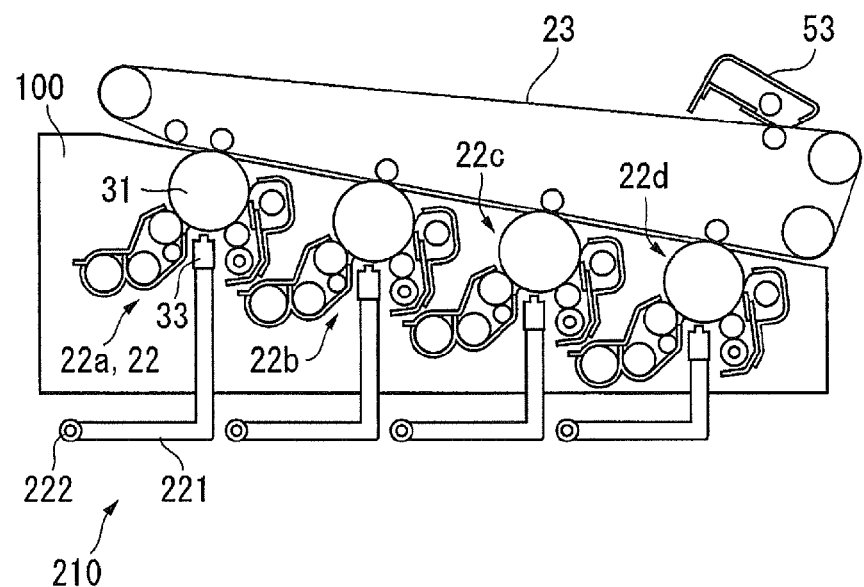
FIG. 17A is an explanatory view illustrating a retractor for the image writing devices used in an image forming apparatus of a third comparative example.
Figure 17B:
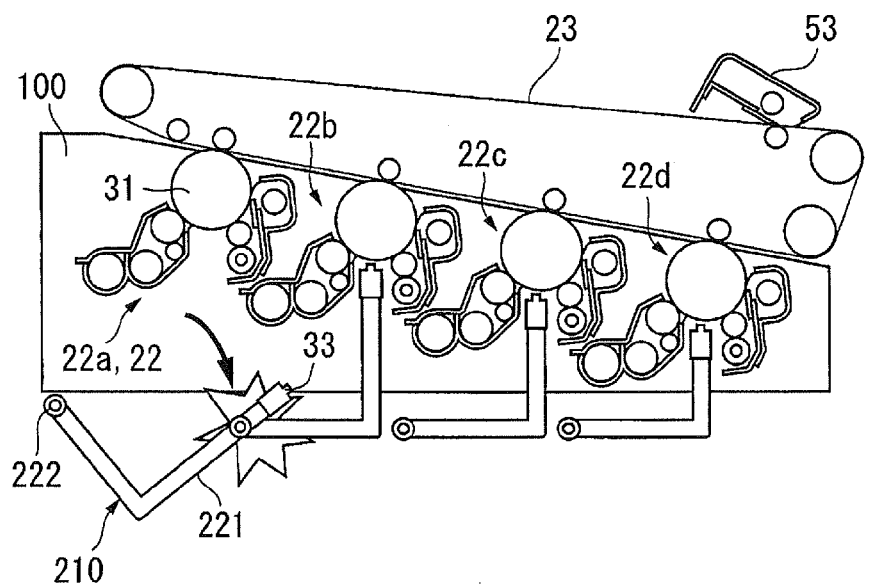
FIG. 17B is an explanatory view illustrating a problem that may occur in a retracting operation process of the retractor for the image writing devices of the third comparative example.

FIGS. 17A and 17B illustrate part of an image forming apparatus of a third comparative example.

Although a basic structure of the image forming apparatus illustrated in FIGS. 17A and 17B is similar to that of the first exemplary embodiment, the retractor 210 for the image writing devices 33, which is different from that of the first exemplary embodiment, is adopted.

The retractor 210 of this example includes plural L-shaped support rods 221 and swing mechanisms 222. The support rods 221 support the image writing devices 33. The swing mechanisms 222 swing the support rods 221 along rotational loci M.

In the present example, as is the case with the second comparative example, retracting the image writing devices 33 by rotating the image writing devices 33 may cause the image writing devices 33 to interfere with the components of the image forming units 22 around the image writing devices 33 without large spaces allocated around the image writing devices 33. Furthermore, even when it is assumed that large spaces are allocated around the image writing devices 33, the L-shaped support rods 221 may interfere with the pivots of the swing mechanisms 222 of the retractor 210 for the respective adjacent image writing devices 33 as illustrated in FIG. 17B.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a plurality of image holding bodies arranged in a predetermined direction;
   a plurality of image writing devices that face the respective image holding bodies and that write images onto the respective image holding bodies;
   a movement member that holds the plurality of image holding bodies, that is able to be drawn through an opening in a cover of a housing of the image forming apparatus, and that is moved in a direction in which the image holding bodies are arranged; and
   a retractor that retracts the image writing devices from a movement region of the movement member when the movement member is drawn through the opening in the cover, the retractor including
      a first retracting mechanism that retracts the image writing devices away from the respective image holding bodies to respective first retracted positions along respective straight loci, and
      a second retracting mechanism that retracts the image writing devices to respective second retracted positions along respective curved loci after the first retracting mechanism has retracted the image writing devices.

2. The image forming apparatus according to claim 1, wherein the plurality of image holding bodies are arranged in a direction inclined downward from the cover side of the apparatus housing.

3. The image forming apparatus according to claim 1, wherein the retractor includes a coupling mechanism, an operation of which is coupled with an opening operation of the cover or a drawing operation of the movement member.

4. The image forming apparatus according to claim 3,
wherein the first retracting mechanism includes
- a plurality of advancing and retracting members that support the image writing devices such that the image writing devices are able to be advanced and retracted along the respective straight loci, and
- a connecting member through which the plurality of advancing and retracting members are connected to one another, and wherein the coupling mechanism includes
- a function member, an operation of which is coupled with the opening operation of the cover or the drawing operation of the movement member and which is engaged with the connecting member so as to retract the advancing and retracting members in a direction away from the image holding bodies.

5. The image forming apparatus according to claim 3,
wherein the second retracting mechanism includes
- a plurality of swing members that support the image writing devices such that the image writing devices are swingable along the respective curved loci, and
- a connecting member through which the plurality of swing members are swingably connected to one another, and wherein the coupling mechanism includes
- a function member, an operation of which is coupled with the opening operation of the cover or the drawing operation of the movement member, and which is engaged with the connecting member so as to swing the swing members so that the image writing devices are retracted to respective positions outside the movement region of the movement member.

6. The image forming apparatus according to claim 1,
wherein the first retracted positions, to which the first retracting mechanism retracts the image writing devices, are set in the movement region of the movement member.

7. The image forming apparatus according to claim 1,
wherein the first retracting mechanism and the second retracting mechanism include respective coupling mechanisms, operations of which are coupled with a drawing operation of the movement member.

8. The image forming apparatus according to claim 1,
wherein the first retracting mechanism includes a coupling mechanism, an operation of which is coupled with an opening operation of the cover, and the second retracting mechanism includes a coupling mechanism, an operation of which is coupled with a drawing operation of the movement member.

\* \* \* \* \*